United States Patent
Schober et al.

(10) Patent No.: US 9,490,883 B2
(45) Date of Patent: Nov. 8, 2016

(54) METHOD, APPARATUS AND COMPUTER PROGRAM FOR CONTROLLING A WIRELESS DEVICE

(71) Applicant: BROADCOM CORPORATION, Irvine, CA (US)

(72) Inventors: Karol Schober, Helsinki (FI); Tommi Tapani Koivisto, Espoo (FI); Mihai Enescu, Espoo (FI)

(*) Notice: Subject to any disclaimer, the term of this patent is extended or adjusted under 35 U.S.C. 154(b) by 0 days.

(21) Appl. No.: 14/773,085

(22) PCT Filed: Jan. 20, 2014

(86) PCT No.: PCT/IB2014/058402
§ 371 (c)(1),
(2) Date: Sep. 4, 2015

(87) PCT Pub. No.: WO2014/135993
PCT Pub. Date: Sep. 12, 2014

(65) Prior Publication Data
US 2016/0020837 A1    Jan. 21, 2016

(30) Foreign Application Priority Data

Mar. 7, 2013 (GB) .................................. 1304108.2

(51) Int. Cl.
H04B 7/02 (2006.01)
H04B 7/04 (2006.01)
H04B 7/06 (2006.01)

(52) U.S. Cl.
CPC .......... H04B 7/0478 (2013.01); H04B 7/0469 (2013.01); H04B 7/065 (2013.01)

(58) Field of Classification Search
CPC ... H04L 1/0618; H04L 1/06; H04L 27/2647; H04B 3/54
USPC .............. 375/267, 260, 259, 219, 296, 297; 455/69
See application file for complete search history.

(56) References Cited

U.S. PATENT DOCUMENTS

| 2012/0039251 A1* | 2/2012 | Sayana | H04B 7/0639 370/328 |
| 2012/0218948 A1* | 8/2012 | Onggosanusi | H04L 1/0031 370/329 |
| 2013/0114655 A1* | 5/2013 | Gomadam | H04L 1/0031 375/219 |
| 2013/0129014 A1 | 5/2013 | Kim et al. | |

FOREIGN PATENT DOCUMENTS

WO    2012 015252    2/2012

OTHER PUBLICATIONS

International Search Report Issued May 9, 2014 in PCT/IB2014/058402 filed Jan. 20, 2014.
"Double codebook design principles", Nokia, Nokia Siemens Networks, 3GPP TSG-RAN WG1 Meeting #61bis, R1-103804, 2010, XP050449423, (9 Pages).

* cited by examiner

Primary Examiner — Helene Tayong
(74) Attorney, Agent, or Firm — Oblon, McClelland, Maier & Neustadt, L.L.P.

(57) ABSTRACT

A double structured codebook is described that has a wideband codebook portion $C(W_1)$ and a frequency-selective codebook portion $C(W_2)$. Portion $C(W2)$ is characterised in that for at least one rank index RI, each codeword of $C(W_2)$ is uniquely distinguished over all other codewords of $C(W_2)$ by at least two beam selection vectors per layer. A device (UE, eNB, etc) utilises the at least two different beam selection 10 vectors per layer to uniquely select a codeword $W_2$ from $C(W_2)$ (404); and constructs a pre-coder W from the selected codeword $W_2$ and from another codeword $W_1$ selected from the wideband codebook portion $C(W_1)$ for signalling channel conditions (406). An additional co-phasing term for ensuring orthogonality can be utilised with the beam selection vectors per layer to uniquely select the codeword from $C(W_2)$, and the two different beam selection vectors per layer correspond to different polarizations (410).

20 Claims, 4 Drawing Sheets

402: store in a local memory of a wireless radio device a double structured codebook comprising a wideband codebook portion $C(W_1)$ and a frequency-selective codebook portion $C(W_2)$; the frequency-selective codebook portion $C(W_2)$ is characterized in that :
- for at least one rank index RI, each codeword of the frequency-selective codebook portion $C(W_2)$ is uniquely distinguished over all other codewords of the frequency-selective codebook portion $C(W_2)$ by at least two beam selection vectors per layer 404: utilize the at least two different beam selection vectors per layer to uniquely select a codeword $W_2$ from the frequency-selective codebook portion $C(W_2)$ when the device is configured with the RI 406: construct a precoder $W$ from the selected codeword $W_2$ and from another codeword $W_1$ selected from the wideband codebook portion $C(W_1)$ for signaling channel conditions 408: $C(W_2)$ comprises codewords for each of multiple RIs, and is characterized in that:
- for each of the RIs each codeword of $C(W_2)$ is uniquely distinguished over all other codewords $C(W_2)$ by at least two different beam selection vectors per layer 410: an additional co-phasing term is utilized with the different beam selection vectors per layer to uniquely select the codeword $W_2$ from $C(W_2)$, and the co-phasing term operates to ensure orthogonality of selected codeword pairs

METHOD, APPARATUS AND COMPUTER PROGRAM FOR CONTROLLING A WIRELESS DEVICE

CROSS REFERENCE TO RELATED APPLICATION

This application claims the benefit under 35 U.S.C. §119 and 37 CFR §1.55 to UK patent application No. 1304108.2, filed on Mar. 7, 2013, the entire content of which is incorporated herein by reference.

TECHNICAL FIELD

The present invention relates to a method, apparatus and a computer program for controlling a wireless device. The exemplary and non-limiting embodiments of this invention relate generally to wireless communication systems, methods, devices and computer programs and specific examples relate to codebooks used for wireless multi-path communications such as multi-input/multi-output (MIMO) and cooperative multipoint (CoMP) communications.

BACKGROUND

Multi-path communications are known in the wireless arts and are used to boost spectral efficiency. For example, the Third Generation Partnership Project (3GPP) Evolved Universal Terrestrial Radio Access system (E-UTRA, alternatively known as Long Term evolution of UTRA or LTE) supports both single-user (SU-) and multi-user (MU-) MIMO schemes. The performance of these MIMO schemes is highly dependent on the quality of channel state information (CSI) feedback obtained from the user equipment (UE). In LTE this CSI feedback comprises a precoding matrix indication (PMI), a channel quality indication (CQI) and a rank indication (RI). The PMIs are selected by the UE from a known codebook; one that is known in advance to both the network access node (eNB) and the UE. The codebook is typically specified in a published wireless protocol, and, where there is a choice of codebooks, the operative one can be made known to the UE via signalling. These codebooks have generally remained the same throughout earlier development of LTE: the codebooks for two and four transmit antennas have been specified already in Release 8 and the codebook for eight transmit antennas was specified in Release 10.

As part of development towards the Release 12 LTE specification, 3GPP is studying further enhancements to CSI feedback, in particular targeting deployments with four transmit antennas at the transmitter side. Specifically, it was agreed in the Radio Access Network Working Group 1 (RAN WG1) meeting referenced immediately below to investigate the so called double codebook (DCB) as a 3GPP Release 12 PMI enhancement for boosting MIMO performance in wireless communications involving 4-transmit (Tx) antennas. The DCB is standardised already in 3GPP Release 10 for 8-Tx antennas; see section 7.2.4 of 3GPP TS 36.213 v11.1.0 (2012-02). It was also proposed to accept this 8-TX codebook structure for 4-Tx antennas because it enables reuse of existing codeword (PMI) selection schemes at the UE-side implementation; see for example document R1-130258 by LG Electronics entitled "Considerations on CSI feedback structure for DL MIMO enhancement" [3GPP TSG RAN WG1 Meeting #72; St. Julian's, Malta; Jan. 28 to Feb. 1, 2013]. The exact codewords are however yet to be agreed.

Specification 3GPP TS 36.213 referred to above has a 4-Tx antenna codebook which was first standardised in Release 8. This 4-Tx codebook can be used as a DCB when an identity matrix is used as the wideband codeword $W_1$.

SUMMARY

According to a first aspect of the present invention, there is provided a method for controlling a wireless radio device to provide feedback about channel conditions, the method comprising: storing in a computer-readable memory of the wireless radio device a double structured codebook comprising a wideband codebook portion $C(W_1)$ and a frequency-selective codebook portion $C(W_2)$, wherein the frequency-selective codebook portion $C(W_2)$ is characterised in that for at least one rank index RI each codeword of the frequency-selective codebook portion $C(W_2)$ is uniquely distinguished over all other codewords of the frequency-selective codebook portion $C(W_2)$ by at least two different beam selection vectors per layer, where RI is a positive integer; for the case in which the wireless radio device is configured with the at least one RI, utilising the at least two different beam selection vectors per layer to uniquely select a codeword $W_2$ from the frequency-selective codebook portion $C(W_2)$; and constructing a precoder W from the selected codeword $W_2$ and from another codeword $W_1$ selected from the wideband codebook portion $C(W_1)$ for signalling channel conditions.

According to a second aspect of the present invention, there is provided apparatus for controlling a wireless radio device to provide feedback about channel conditions, the apparatus comprising: a processing system configured to cause the wireless radio device at least to: store in the memory a double structured codebook comprising a wideband codebook portion $C(W_1)$ and a frequency-selective codebook portion $C(W_2)$, wherein the frequency-selective codebook portion $C(W_2)$ is characterised in that for at least one rank index RI each codeword of the frequency-selective codebook portion $C(W_2)$ is uniquely distinguished over all other codewords of the frequency-selective codebook portion $C(W_2)$ by at least two different beam selection vectors per layer, where RI is a positive integer; for the case in which the wireless radio device is configured with the at least one RI, to utilise the at least two different beam selection vectors per layer to uniquely select a codeword $W_2$ from the frequency-selective codebook portion $C(W_2)$; and to construct a precoder W from the selected codeword $W_2$ and from another codeword $W_1$ selected from the wideband codebook portion $C(W_1)$ for signalling channel conditions.

According to a third aspect of the present invention, there is provided a computer program comprising a set of computer-executable instructions for controlling a wireless radio device to provide feedback about channel conditions, in which the set of computer-executable instructions comprises: code for storing in a computer-readable memory of the wireless radio device a double structured codebook comprising a wideband codebook portion $C(W_1)$ and a frequency-selective codebook portion $C(W_2)$, wherein the frequency-selective codebook portion $C(W_2)$ is characterised in that for at least one rank index RI each codeword of the frequency-selective codebook portion $C(W_2)$ is uniquely distinguished over all other codewords of the frequency-selective codebook portion $C(W_2)$ by at least two different beam selection vectors per layer, where RI is a positive integer; code, executable for the case in which the wireless radio device is configured with the at least one RI, for utilising the at least two different beam selection vectors per layer to uniquely select a codeword $W_2$ from the frequency-selective codebook portion $C(W_2)$; and code for constructing a precoder W from the selected codeword $W_2$ and from another codeword $W_1$ selected from the wideband codebook portion $C(W_1)$ for signalling channel conditions.

The processing system described above may comprise at least one processor and a memory storing a set of computer instructions.

There may be provided a computer-readable memory tangibly storing a set of computer-executable instructions as described above.

Examples of the teachings detailed below concern a double codebook structure and the examples are in the context of 4-Tx antennas. Advantages over prior art codebooks are quite pronounced for the rank-2 codewords that are included in the codebook.

Improved CSI accuracy by examples of the teachings below can also be used for CoMP communications, which is another species of the genus multi-path communications. CoMP utilises multiple communication points or nodes which are physically separated from one another to communicate the same or different data at the same time to a receiving party, whereas MIMO is often understood to imply that multiple antenna ports of a singular transmitting party are used to spatially separate simultaneous same-data transmissions to a single receiving party. These teachings can also be utilised in a hybrid MIMO/CoMP deployment where at least one of the CoMP transmitting entities is using MIMO, and codewords for the total of all the involved CoMP Tx-antenna ports are selected from the same codebook.

Further features and advantages of the invention will become apparent from the following description of preferred embodiments of the invention, given by way of example only, which is made with reference to the accompanying drawings.

BRIEF DESCRIPTION OF THE DRAWINGS

FIG. 4 shows a logic flow diagram that illustrates an example of a method for operating a wireless radio device, such as for example a user equipment/UE or a network access device, and a result of execution by an apparatus of a set of computer program instructions embodied on a computer-readable memory for operating such a device, in accordance with certain exemplary embodiments of this invention.

DETAILED DESCRIPTION

Figure 1:
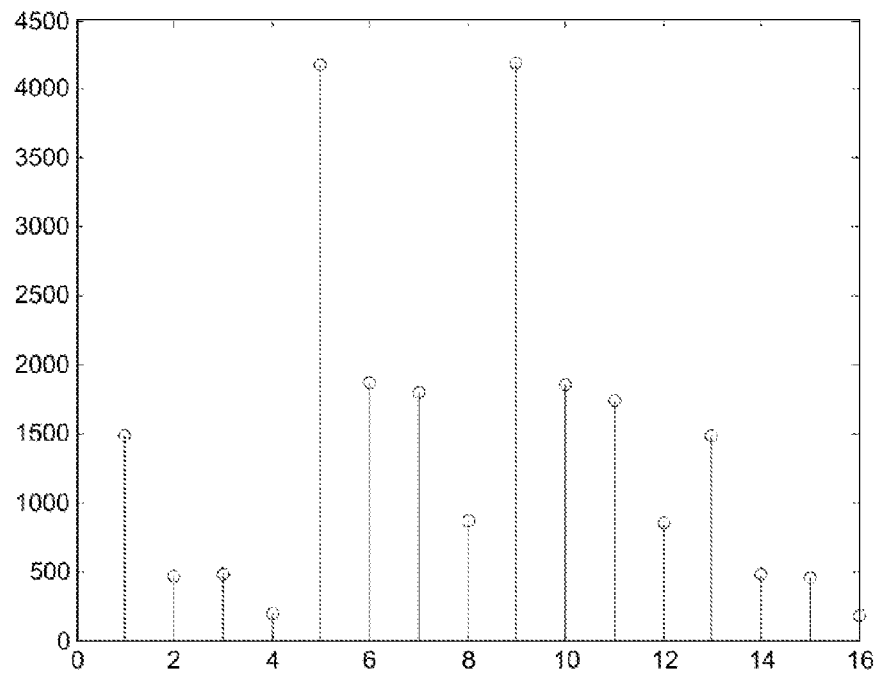
FIG. 1 shows a graph of codewords along the horizontal and selection frequency along the vertical axis showing selection statistics for a rank-2 $W_2$ codeword from a prior art double codebook DCB-1 in ITU UMa NLoS (XP) with feedback mode 3-2.

The examples below are in the context of the E-UTRA system, including future releases such as what is now being contemplated as LTE-Advanced (LTE-A), but these radio access technology contexts are not limiting to the broader teachings herein. In other deployments these teachings for reporting channel conditions may be utilised with other types of radio access technologies (RATs) as may be developed for 4-Tx MIMO/CoMP, including but not limited to Wideband Code Division Multiple Access (WCDMA) and other wireless radio technologies now established or yet to be developed.

These teachings are best appreciated in comparison to current practices for codeword structure and selection. As noted above, the more comprehensive CSI feedback comprises PMI, CQI and RI. Conventional LTE allows wideband or per sub-band reporting of CQI and PMI, where one reporting sub-band consists of some integer number of physical resource blocks (PRBs) where the number of the PRBs depends on the system bandwidth and the UE's feedback mode. For example, assuming a 10 MHz bandwidth and feedback modes other than mode 2-2, the sub-band size is 6 PRBs and the RI is always reported wideband.

3GPP TS 36.213 mentioned above defines different feedback modes as combinations of wideband and sub-band reporting of CQI and PMI. For example, feedback mode 3-1 means wideband PMI reporting and sub-band CQI reporting, and feedback mode 2-2 means PMI and CQI are reported for the best M sub-bands which are selected by the UE. Conventional LTE defines a further feedback mode 1-2 with sub-band PMI and wideband CQI.

In general, a double structured codebook has both a wideband component $(W_1)$ which is long term and a frequency-selective (sub-band) component $(W_2)$ which is short term, so a double structured 4-Tx codebook W can be defined as $W=W_1 W_2$, where $$W_1^m = \begin{bmatrix} b_m & b_{m+1} & \ldots & b_{m+M-1} & 0 & 0 & 0 & 0 \\ 0 & 0 & 0 & 0 & b_m & b_{m+1} & \ldots & b_{m+M-1} \end{bmatrix}.$$

The terms $$b_m = \begin{bmatrix} 1 \\ e^{\frac{i2\pi m}{n}} \end{bmatrix}$$

are N discrete Fourier transform (DFT) oversampled vectors, where N represents the number of base vectors and M represents the number of neighbouring base beams indexed by m. Each of these terms represents a beam when applied as an antenna weight on an antenna array or sub-array. A given sub-array may for example correspond to antennas having the same polarization or to a sub-group of antennas of a uniform linear array of antennas.

The wideband portion of the codebook $C(W_1)$ is the same for both rank-1 and rank-2. This structure stems from the existing 8-Tx double codebook that has been specified in Release 10 at TS 36.213 v11.1.1 and is shown for 4-Tx antennas in document R1-130258 (both of which are referenced above in the background section).

For the frequency-selective portion of the codebook $C(W_2)$ there are several indices i, j, k and l, depending on the rank index where i, k and l are each $\in \{1 \ldots M\}$ in which M is the total number of neighbouring base beams that are included in the corresponding $W_1$ codeword. Indices i, k and l represent different layers such that there is one layer for RI=1, two layers for RI=2, three layers for RI=3, and so forth. The UE uses different beam selection vectors $s_i$, $s_k$ and $s_l$ to select a given codeword from the frequency-selective portion of the codebook $C(W_2)$ for a given rank.

In rank-1, according to conventional practice the frequency-selective $W_2$ codewords are formed as:

$$W_2^{i,j} = \begin{bmatrix} s_i \\ e^{i\theta_j} s_i \end{bmatrix},$$

where $i \in \{1 \ldots M\}$ as above; $s_i$ is the beam selection vector for the RI=1 layer which has all zeros and one at the i-th position; i is the imaginary unit; and $\theta_j$ is an arbitrarily chosen cross-polarization co-phasing term, for example from M-PSK alphabet. So conventionally the UE selects the $W_2$ codeword for RI=1 using one beam selection vector and a co-phasing term.

In rank-2, according to conventional practice (Table 7.2.4-2 of TS36.213) the frequency-selective $W_2$ codewords are formed as:

$$W_2^{i,k,j} = \begin{bmatrix} s_i & s_k \\ e^{i\theta_j} s_i & -e^{i\theta_j} s_k \end{bmatrix},$$

where $i \in \{1 \ldots M\}$ and $k \in \{1 \ldots M\}$ as above. Conventionally the UE selects the $W_2$ codeword for RI=2 using two beam selection vectors and a co-phasing term. More generally, the UE uses one beam selection vector per layer and a co-phasing term for its selection of the $W_2$ codeword. It is important to recognise that when i=k, the term $e^{i\theta_j}$ does not generate a new codeword but provides only orthogonalization of the codeword. This orthogonality is particularly beneficial for linear receivers because non-linear receivers can better cope with non-orthogonality among codewords.

In general, the conventional rank-2 structure above allows for only a limited number of codewords that are optimised for cross-polarized antenna arrays, and so the rank-2 performance of this structure is not providing full flexibility for cross-polarized antenna setups. Specifically, for the case of 8-Tx codebooks half of the rank-2 codewords (i=k) are fitting better co-polarized antenna setups (uniform linear array, ULA). However, cross-polarized antennas are typically considered more relevant for practical deployments.

For this reason, and also because the probability of rank-2 with co-polarized antenna arrays is usually very low, these teachings below present a codebook structure that optimises rank-2 codewords for cross-polarized antenna arrays. The operative assumption is a medium or highly correlated channel at the transmitter side, which implies closely-spaced TX-antenna elements.

These teachings provide a different structure for the frequency-selective codewords which enables an increased number of these codewords as compared to the conventional codebooks in LTE. Advantageously, a codebook according to embodiments of these teachings provides an increased number of usable rank-2 codewords in case of cross-polarized antenna arrays. This is particularly beneficial in lower load finite buffer traffic conditions where higher rank single user MIMO is likely to be utilised.

The teachings herein present a novel $W_2$ rank-2 codeword structure that brings a new dimension to dual codebook codewords. The general structure for the rank-2 codewords according to an embodiment of these teachings can be expressed as $$W_2^{i_1,i_2,k_1,k_2,j} = \begin{bmatrix} s_{i_1} & s_{k_1} \\ e^{i\theta_j} s_{i_2} & -e^{i\theta_j} c s_{k_2} \end{bmatrix},$$

where $c_{i1,i2} = e^{-j2\angle\{s_{i2}^H s_{i1}\}}$ and $i_1 = k_2$, $i_2 = k_1$. Note that the general case when $i_1 \neq i_2 \neq k_1 \neq k_2$ does not guarantee that final precoder will be of constant modulus and therefore the restriction $i_1 = k_2$, $i_2 = k_1$ is necessary in an example. There are thus two beam selection vectors per layer for this structure: $s_{i1}$, $s_{i2}$, $s_{k1}$ and $s_{k2}$. Each pair of same-layer beam selection vectors represent different polarizations, given above by the term $\theta$. Since the conventional $W_2$ codebook used one beam selection vector per layer, in order to use the above notation for those conventional codebooks there would be a requirement always that $i_1 = i_2$ and $k_1 = k_2$. In the novel codebook structure above, for the case of M=4 the codebook allows 4!/2!/2!=6 new rank 2 codewords as compared to the conventional codebooks. If 4-PSK is used for $\theta_j$ then there are 6*4=24 new unique codewords using the above structure.

Since in the above example there are two different beam selection vectors and a co-phasing term, there are a total of three degrees of freedom for the rank-2 frequency-selective codewords $W_2$ according to these teachings, meaning that in the frequency-selective portion of the codebook $C(W_2)$ there can be a total of $$\binom{M}{2} \times J$$

new unique codewords from which to select, where $$\binom{M}{2}$$

denotes M choose 2.

This rank-2 codeword structure exhibits the following three aspects:
The same-layer beam selection vectors corresponding to the two polarizations are different; that is, $i_1 \neq i_2$ and $k_1 \neq k_2$.
The beam selection vectors are flipped for the second layer; that is, $i_1 = k_2$ and $i_2 = k_1$.
An additional co-phasing term −c is added to ensure the orthogonality of the codewords.

The above codeword structure produces orthogonal codewords for every codeword of a frequency-selective codebook (portion) $C(W_1)$. Since the structure utilises multiple beams instead of the same beam for each layer (that is, the new codebook structure utilises a different beam for each antenna polarization), it is quite useful in radio channels with a high angular (azimuth) spread.

For rank 1, it is advantageous to preserve the so called "nested" property, which in essence means that each rank-2 codeword contains a rank 1 codeword as one of its columns. When UE-specific reference signals are utilised for demodulation, the nested property mainly helps with codeword selection complexity at the UE side since some of the UE's calculations for codeword selection can be re-used. Depending on whether the nested property is to be preserved, different implementations of the codeword structure detailed herein may lead to different rank 1 codeword structures.

For example, in an embodiment in which the nested property is not preserved, no changes to the rank 1 4-Tx codebook are needed. But in another embodiment, the corresponding rank 1 codeword $W_2$ which guarantees that the nested property is preserved may be defined as:

$$W_2^{i1,i2,j} = \begin{bmatrix} s_{i_1} \\ e^{i\theta_j} s_{i_2} \end{bmatrix}.$$

In the latter embodiment above, the structure of $W_1$ is designed to better fit the uniform linear array (ULA) antenna arrays. That is, when $$W_1^m = \begin{bmatrix} b_m(1:2) & b_{m+1}(1:2) & \ldots & b_{m+M-1}(1:2) & 0 & 0 & 0 & 0 \\ 0 & 0 & 0 & 0 & b_m(3:4) & b_{m+1}(3:4) & \ldots & b_{m+M-1}(3:4) \end{bmatrix}$$

where $$b_m(1:4) = \begin{bmatrix} 1 & e^{\frac{i2\pi m}{N}} & e^{2\frac{i2\pi m}{N}} & e^{3\frac{i2\pi m}{N}} \end{bmatrix}^T,$$

the addition of the co-phasing term is set to $c_{\{i1,i2\}} = e^{-j6\angle\{s_{i2}^H s_{i1}\}}$.

For rank-3, codewords with the structure according to embodiments of these teachings may be constructed as $$W_2^{i1,i2,k_1,k_2,l_1,l_2,j} = \begin{bmatrix} s_{i_1} & s_{k_1} & s_{l_1} \\ e^{i\theta_j} s_{i_2} & -e^{i\theta_j} c s_{k_2} & e^{i\theta_j} c_2 s_{l_2} \end{bmatrix},$$

where
$s_{i_1} \perp s_{l_1}$ and $s_{i_2} \perp s_{l_2}$ and $|l_1 - k_1| = |l_2 - k_2|$, or
$s_{k_1} \perp s_{l_1}$ and $s_{k_2} \perp s_{l_2}$ and $|l_1 - i_1| = |l_2 - i_2|$.
Note that for 2-Tx beams, $s_{i_1} \perp s_{l_1}$ implies $l_1 - k_1 = l_2 - k_2$. For 2-Tx beams, if
$s_{i_1} \perp s_{l_1}$ and $s_{i_2} \perp s_{l_2}$, then $c_2 = 1$; else
$s_{k_1} \perp s_{l_1}$ and $s_{k_2} \perp s_{l_2}$, then $c_2 = c$.
The above rank 3 layer is based on four design aspects:
The novel structure for rank 2 is used for layers one and two.
For each polarization, the beam in the third layer is orthogonal to beams in the first and second layer.
In case that beams are for more than two antennas, for each polarization, the absolute value of the beam shift/difference between the second/first layer beam and the third layer beam are the same.
An additional co-phasing term $c_2$ is added to ensure the orthogonality of the codewords.

Embodiments of these teachings using the new codebook structure may be readily implemented in existing infrastructure systems in that the signalling can in essence be the same as is used in LTE Release 10.

A MIMO closed loop communication system can be described in general as follows. The transmitting entity, such as the network access node/eNB:
signals the used codebook to the UE together with codebook subset restriction (the codebook may also be specified such that both UE and eNB know it without signalling, and if signalling is used it is to identify a subset restriction on the specified codebook);
transmits CSI-RS or CRS reference signals and possibly configure the interference measurement resource (IMR) on the downlink;
receives the precoding matrix indices (PMIs) on the uplink;
precodes the UE specific downlink signals (for example, the physical downlink shared channel PDSCH or the enhanced physical downlink control channel EPDCCH) with precoding codewords corresponding to the received PMIs.
At least a subset of the PMIs included in the codebook follow the codebook format set forth herein.

The receiving entity, such as the user equipment (UE):
estimates the downlink channel based on CSI-RS or CRS and interference measurements (for example, at least on the configured IMR);
selects a best performing precoding codeword $\check{W} = \check{W}_1 \check{W}_2$ based on the estimated channels and interference on the downlink;
The codeword is selected out of the codebook, which contains at least a subset of codewords/PMIs that follow the format detailed herein.
finds the corresponding PMIs. The selected precoding codewords $\check{W}_1$ and $\check{W}_2$ can be estimated independently, sequentially, or jointly; and
signals the PMIs to the eNB.

Following are some simulations the inventors have performed for comparison purposes against the conventional LTE 8-Tx codebook. FIG. 1 shows codeword selection statistics for a codebook that is downscaled to 4-Tx antennas from the conventional LTE 8-Tx antenna codebook, which is designated in the table below as "prior art DCB-2" for rank 2. These statistics illustrate that the rank-2 codewords corresponding to co-polarized antenna arrays are left almost unused in the case of cross-polarized antenna arrays. For good rank-2 performance in the case of cross-polarized arrays it would be best if all codewords are equally.

But as mentioned above, the LTE prior art rank-2 structure allows for only a limited number of unique codewords that are optimised for cross-polarized antennas. Such codewords are characterised by having the same beam over each of the two polarizations for both layers, which means $k \neq i$ in the prior art equation for rank-2 codewords $$W_2^{i,k,j} = \begin{bmatrix} s_i & s_k \\ e^{i\theta_j} s_i & -e^{i\theta_j} s_k \end{bmatrix}.$$

Having these three degrees of freedom (two beam selection vectors and $\theta$) across the two layers enables a maximum of $$\binom{M}{2} \times J W_2$$

codewords. With M=4 and J=4, 24 unique codewords may be constructed, which are however of the same structure and thus using all of them in the codebook would not be beneficial.

The new degree of freedom per layer (polarization for the beam selection vector) for rank-2 DCB codewords according to these teachings is beneficial for codebook design. The table below reflects the inventors' measurements of full band received (Rx) power for two DCB codebooks with the prior art LTE 8-Tx codeword structure, and for a DCB codebook that includes codewords according to the structure presented above. These measurements have been taken for both feedback mode 3-1 and feedback mode 3-2.

While full band received power readily tells the beamforming gain of the codebook for rank-1, that same metric is useful for comparison purposes for rank-2 despite that for rank-2 codeword orthogonalization comes into play, meaning the full band received power is not always a solid indicator of codebook throughput. However, received power corresponds well to system performance with non-linear receiver. Thus the table below is useful for comparing rank-1 performance and for comparing rank-2 performance as between the prior art codebook and a codebook according to these teachings; the data is not necessarily representative of performance improvement as between rank-1 and rank-2.

In these simulations, users were dropped uniformly in one sector of the cell and the channel used was a non-line-of-sight (NLoS) and line-of-site (LoS) urban macrocell (UMa) from the International Telecommunications Union-Radio (ITU-R) recommendations. The average received power for rank-2 transmission with different codebooks is summarised in the table below, which identifies a codebook with codeword structure according to these teachings as the "Proposed codebook". Note that this "proposed codebook" with codewords having the structure detailed herein performs the best in a UMa channel environment. The results in the top three rows correspond to a codebook with N=32 base beams in $W_1$, and results in the lower three rows correspond to a codebook with N=16 base beams in $W_1$. The SVD precoder refers to a singular value decomposition (SVD).

AVERAGE RX POWER DELIVERED RELATIVE TO POWER
DELIVERED BY SVD PRECODER:

| Codebook | ITU UMa NLoS (XP) Mode 3-1 | ITU UMa NLoS (XP) Mode 3-2 |
| --- | --- | --- |
| Prior art DCB-1, N = 32 | 0.8538 | 0.8616 |
| Prior art DCB-2, N = 32 | 0.8609 | 0.8707 |
| Proposed DCB, N = 32 | 0.8643 | 0.8769 |
| Prior art DCB-1, N = 16 | 0.8528 | 0.8626 |
| Prior art DCB-2, N = 16 | 0.8597 | 0.8742 |
| Proposed DCB, N = 16 | 0.8634 | 0.8830 |

In these simulations FIG. 1 shows the rank-2 $W_2$ part codeword selection for prior art DCB-1 codebook and with feedback mode 3-2. In this codebook M=4 and N=32/16 DFT vectors, m={1 . . . 16} and beam overlap is two/three. In $W_2^{i_1,i_2,k_1,k_2,j}$, $\{i_1, i_2, k_1, k_2\}=\{1,1,1,1\}\{2,2,2,2\}\{3,3,3,3\}\{4,4,4,4\}$ and phase θ is quantised with two bits, $$\theta_j = \left\{0, \frac{\pi}{4}, \frac{2\pi}{4}, \frac{3\pi}{4}\right\}.$$

This codebook has 16 $W_2$ codewords and performs poorly.

Figure 2:
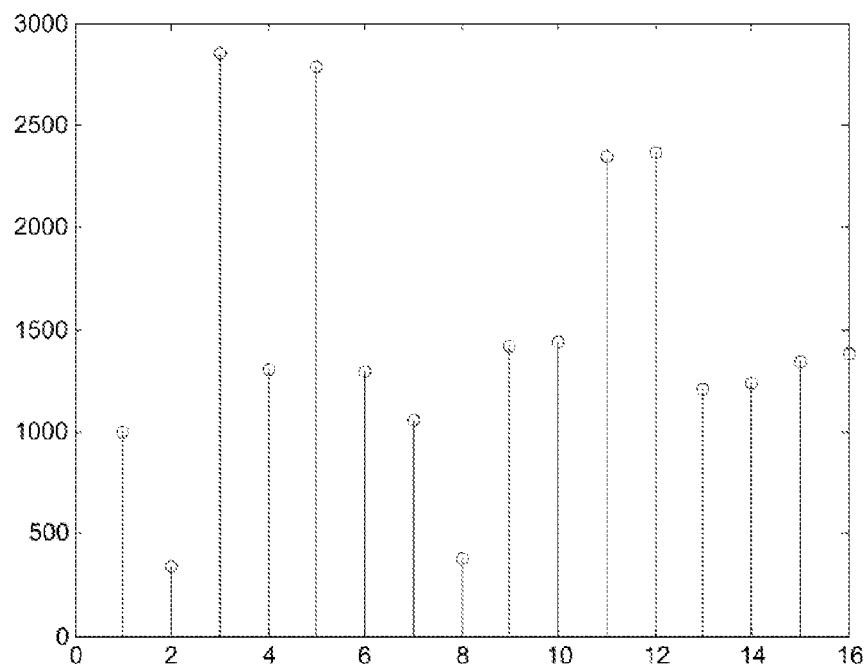
FIG. 2 is similar to FIG. 1 but for a prior art DCB-2.

FIG. 2 shows the rank-2 $W_2$ part codeword selection for the prior art DCB-2 codebook and with feedback mode 3-2. In this codebook M=4 and N=32/16 DFT vectors, m={1 . . . 16} and beam overlap is two/three. In $W_2^{i_1,i_2,k_1,k_2,j}$, $\{i_1, i_2, k_1, k_2\}=\{1,1,1,1\}\{2,2,2,2\}\{3,3,3,3\}\{4,4,4,4\}\{1,1,2,2\}\{2,2,3,3\}\{1,1,4,4\}\{2,2,4,4\}$ and phase θ is quantised with one bit, $\theta_j=\{0,\pi/2\}$. This codebook has 16 $W_2$ codewords. This codebook performs better and $W_2$ is the same as in the conventional 8-Tx Release 10 codebook.

Figure 3:
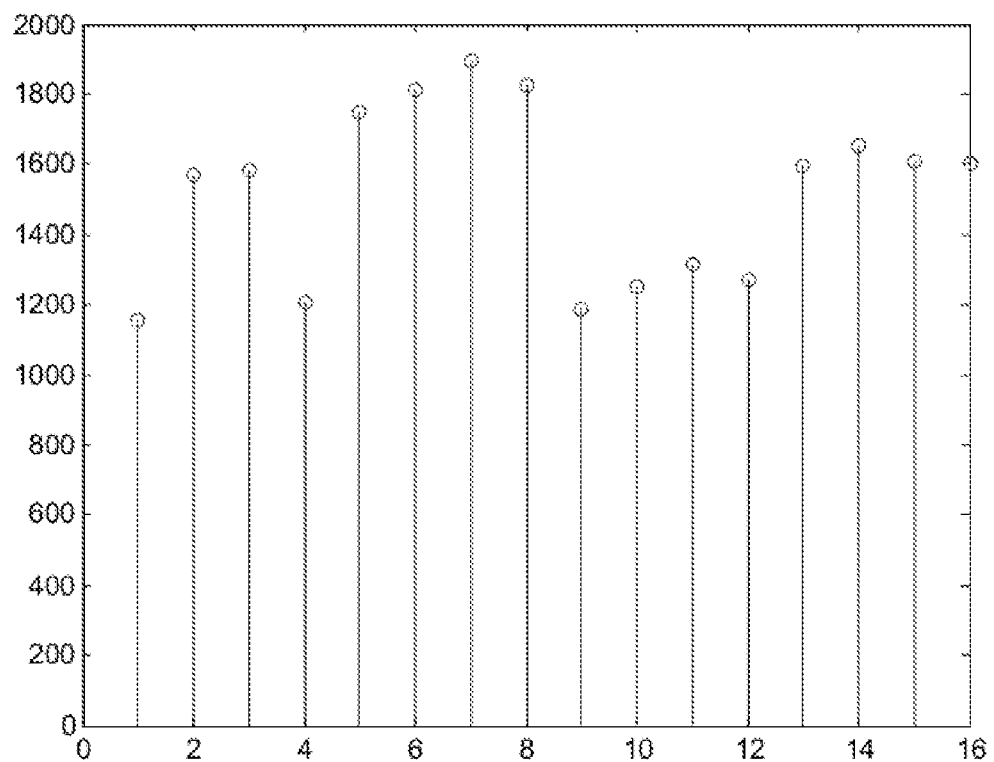
FIG. 3 is similar to FIG. 1 but for a rank-2 $W_2$ codeword from a double codebook DCB according to an example of these teachings, with the same ITU UMa NLoS (XP) with feedback mode 3-2 as for FIGS. 1-2.

FIG. 3 shows the rank-2 $W_2$ part codeword selection for a codebook with the new codeword structure detailed herein, and with feedback mode 3-2. In this codebook M=4 and N=32/16 DFT vectors, m={1 . . . 16} and beam overlap is two/three. In $W_2^{i_1,i_2,k_1,k_2,j}$, $\{i_1, i_2, k_1, k_2\}=\{1,1,2,2\}\{2,2,2,2\}\{3,3,3,3\}\{3,3,4,4\}\{2,2,3,3\}\{1,1,4,4\}\{1,3,3,1\}\{4,2,2,4\}$. Phase θ is quantised variably for each $\{i_1, i_2, k_1, k_2\}$ group, where $$\theta_j = \left\{0, \frac{\pi}{4}, \frac{2\pi}{4}, \frac{3\pi}{4}, \frac{4\pi}{4}, \frac{5\pi}{4}, \frac{6\pi}{4}, \frac{7\pi}{4}\right\}$$

and j corresponding to groups is j={1}{3}{1}{3}{2,4,6,8}{2,4,6,8}{1,5}{1,5}. This codebook has 16 $W_2$ codewords and performs the best of all those shown in that the likelihood of selecting any of the 16 different $W_2$ codewords is much more uniform in FIG. 3 than in FIG. 1 or 2. In feedback mode 3-2, the new structured codeword groups $\{i_1, i_2, k_1, k_2\}=\{1,3,3,1\}\{4,2,2,4\}$ corresponding to codewords 13-16 are selected as often as the other codewords.

Embodiments of these teachings provide the technical effect of improving at least the rank-2 codebooks in channel environments having non-negligible angular spreads.

FIG. 4 presents a summary of the some of the above teachings for controlling a wireless radio device, such as a UE or a network access node to provide feedback about channel conditions. Such a UE can be implemented as a mobile phone, mobile terminal, cellular handset and the like, and the network access node can be implemented as an eNodeB, a NodeB, a base station, an access point AP, and the like.

Block 402 outlines that the wireless radio device stores in its local computer-readable memory a double structured codebook comprising a wideband codebook portion $C(W_1)$ and a frequency-selective codebook portion $C(W_2)$. The frequency-selective codebook portion $C(W_2)$ is characterised in that, for at least one rank index RI, each codeword of the frequency-selective codebook portion $C(W_2)$ is uniquely distinguished over all other codewords of the frequency-selective codebook portion $C(W_2)$ by at least two beam selection vectors per layer. RI is of course a positive integer. Block 404 then summarises that the device, when configured with the at least one RI mentioned in block 402, utilises the at least two different beam selection vectors per layer to uniquely select a codeword $W_2$ from the frequency-selective codebook portion $C(W_2)$. The device puts that selected codeword to use at block 406 where it constructs a precoder W from the selected codeword $W_2$ and from another codeword $W_1$ selected from the wideband codebook portion $C(W_1)$. This precoder is for signalling channel conditions.

Some of the non-limiting implementations detailed above are also summarised at FIG. 4 following block 406. Block 408 extends the "at least one RI" of block 402 to all Ms represented in the codebook. Specifically, the frequency-selective codebook portion $C(W_2)$ comprises codewords for each of multiple RIs, and is characterised in that for each of those Ms each codeword of the frequency-selective codebook portion $C(W_2)$ is uniquely distinguished over all other codewords of the frequency-selective codebook portion $C(W_2)$ by at least two different beam selection vectors per layer.

Block 410 summarises that the device utilises an additional co-phasing term (c in the above examples), along with the at least two different beam selection vectors per layer at blocks 404 and 408, to uniquely select the codeword $W_2$ from the frequency-selective codebook portion $C(W_2)$. This co-phasing term operates to ensure orthogonality of selected codeword pairs.

In the examples above, for each layer the at least two different beam selection vectors noted at blocks 402, 406 and 408 correspond to different polarizations. Examples are detailed above for rank-1 (RI+1). Rank-2 (RI=2) and rank-3 (RI=3), with particular advantages shown for rank 2.

For example, for RI=2 the at least two different beam selection vectors for RI=2 comprise:

$s_{i1}$ and $s_{i2}$ for a first one of the RI=2 layers, and
$s_{k1}$ and $s_{k2}$ for a second one of the RI=2 layers,
wherein $i_1$, $i_2$, $k_1$ and $k_2$ are selected from an integer set $\{1 \ldots M\}$ in which M represents a number of neighbouring base beams included in the another codeword $W_1$ that is selected at block 406 from the wideband codebook portion $C(W_1)$, and further wherein $i_1 \neq i_2$ and $k_1 \neq k_2$. In a more specific embodiment of the RI=2 example, for the second one of the layers $i_1 = k_2$ and $i_2 = k_1$.

As another example, for RI=1 the at least two different beam selection vectors for RI=1 comprise sir and sit for the RI=1 layer.

And as a third example, for RI=3 the at least two different beam selection vectors for RI=3 comprise:

$s_{i1}$ and $s_{i2}$ for a first one of the RI=3 layers,
$s_{k1}$ and $s_{k2}$ for a second one of the RI=3 layers, and
$s_{i1}$ and $s_{i2}$ for a third one of the RI=3 layers;
wherein either
$s_{i_1} \perp s_{l_1}$ and $s_{i_2} \perp s_{l_2}$ and $|l_1 - k_1| = |l_2 - k_2|$, or
$s_{k_1} \perp s_{l_1}$ and $s_{k_2} \perp s_{l_2}$ and $|l_1 - i_1| = |l_2 - i_2|$.

One characteristic of a codebook according to the teachings for RI=3 immediately above is that each of the beam selection vectors in the third one of the layers is orthogonal to each of the beam selection vectors in the first and in the second ones of the layers that have corresponding polarizations.

The logic diagram of FIG. 4, and the summary above from the perspective of the wireless radio device, may be considered to illustrate the operation of an example of a method, and a result of execution of a computer program stored in a computer-readable memory, and a specific manner in which components of an electronic device are configured to cause that electronic device to operate, whether such an electronic device is the UE, the access node/eNB, or one or more components thereof such as a modem, chipset, or the like. The various blocks shown in FIG. 4 or described in text above may also be considered as a plurality of coupled logic circuit elements constructed to carry out the associated function(s), or specific result of strings of computer program code or instructions stored in a memory.

Such blocks and the functions they represent are non-limiting examples, and may be practised in various components such as integrated circuit chips and modules, and the exemplary embodiments of this invention may be realised in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/mobile terminal or an access node/eNB, to perform the various functions summarised at FIG. 2 and above and (c) circuits, such as a microprocessor(s) or a portion of a microprocessor(s), that require software or firmware for operation, even if the software or firmware is not physically present. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a UE or a similar integrated circuit in a network access node or other network device which operates according to these teachings.

Figure 5:
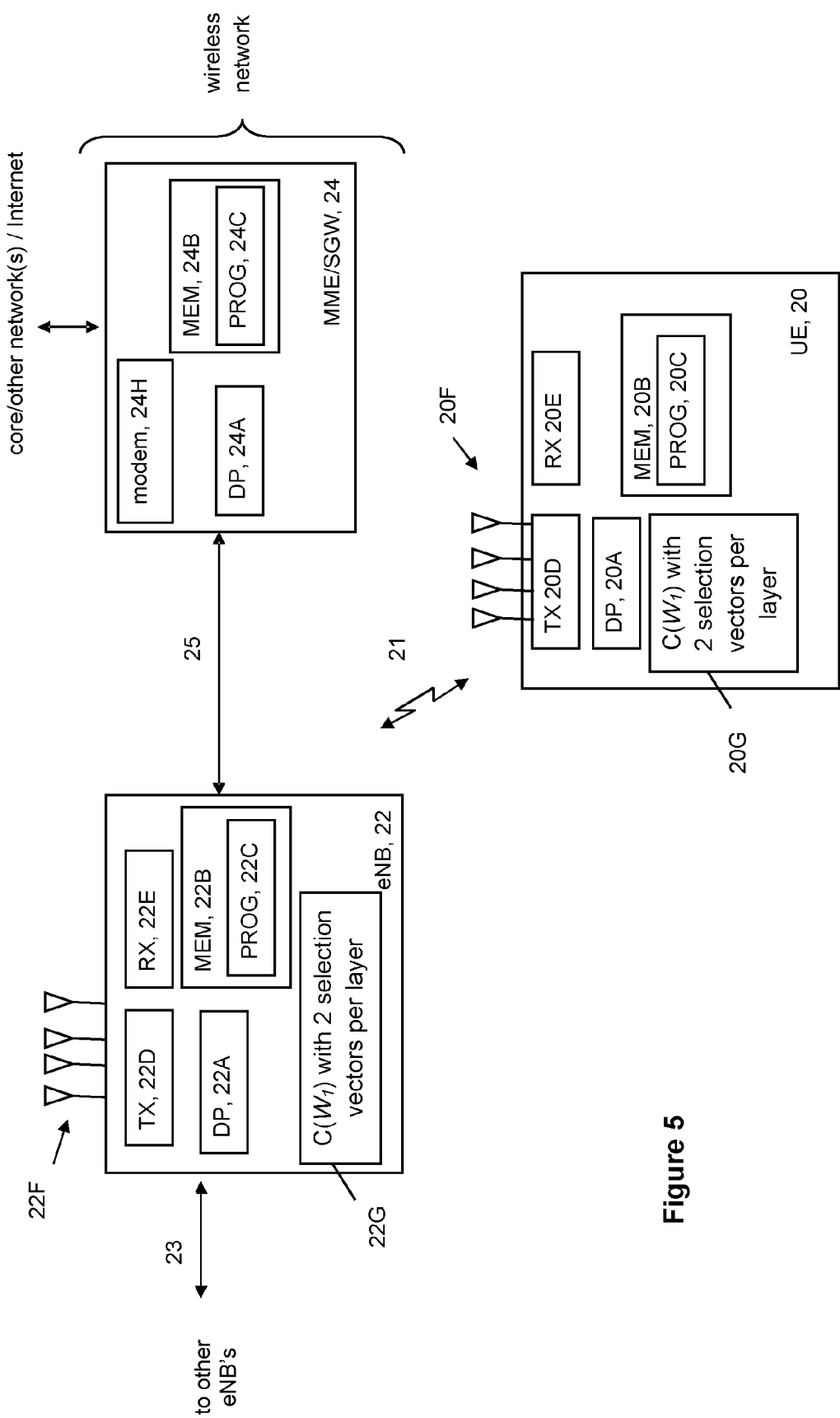
FIG. 5 shows a simplified block diagram of examples of a UE and a wireless radio network represented by an eNodeB (eNB) and by a serving gateway, which are exemplary electronic wireless radio devices suitable for use in practicing the exemplary embodiments of the invention.

Reference is now made to FIG. 5 for illustrating a simplified block diagram of examples of various electronic devices and apparatus that are suitable for use in practising the exemplary embodiments of this invention. In FIG. 5 an eNB 22 is adapted for communication over a wireless link 21 with an apparatus, such as a mobile terminal or UE 20. The eNB 22 may be any access node (including frequency selective repeaters) of any wireless network, such as LTE, LTE-A, GSM, GERAN, WCDMA, WLAN and the like. The operator network of which the eNB 22 is a part may also include a network control element such as a mobility management entity MME and/or serving gateway SGW 24 or radio network controller RNC which provides connectivity with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, and communicating means such as a transmitter TX 20D and a receiver RX 20E for bidirectional wireless communications with the eNB 22 via one or more antennas 20F (four shown per the above examples). Also stored in the MEM 20B at reference number 20G is the codebook portion $C(W_1)$ with two (or possibly more) selection vectors per layer as detailed in any of the various teachings above detailed above. Such a codebook may be implemented in the memory as an algorithm or look-up table for example without departing from these teachings.

The eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F (four being shown). The eNB 22 stores at block 22G a similar codebook portion $C(W_1)$ with two or more selection vectors per layer as detailed above.

While not particularly illustrated for the UE 20 or eNB 22, those devices are also assumed to include as part of their wireless communicating means a modem and/or a chipset which may or may not be inbuilt onto an RF front end chip within those devices 20, 22 and which also operates as set forth in detail above.

At least one of the PROGs 20C in the UE 20 is assumed to include a set of program instructions that, when executed by the associated DP 20A, enable the device to operate in accordance with the exemplary embodiments of this invention, as detailed above of which some are summarised at FIG. 2. The eNB 22 also has software stored in its MEM 22B to implement certain aspects of these teachings according to the above detailed embodiments. In these regards the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware). Electronic devices implementing these aspects of the invention need not be the entire devices as depicted at FIG. 5 and may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular and other types of mobile telephones, mobile terminals, navigation devices, laptop/palmtop/tablet computers, digital cameras and music devices, and Internet appliances.

Various embodiments of the computer-readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-Advanced systems, as noted above the exemplary embodiments of this invention are not limited for use with only this particular type of wireless communication system.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for controlling a wireless radio device to provide feedback about channel conditions, the method comprising:
   storing, in a computer-readable memory of the wireless radio device, a double structured codebook comprising a wideband codebook portion $C(W_1)$ and a frequency-selective codebook portion $C(W_2)$, wherein the frequency-selective codebook portion $C(W_2)$ includes information structured so that for at least one rank index (RI), each codeword of the frequency-selective codebook portion $C(W_2)$ is uniquely distinguished over all other codewords of the frequency-selective codebook portion $C(W_2)$ by at least two beam selection vectors per layer, and the at least one RI is a positive integer;
   utilizing, when the wireless radio device is configured with the at least one RI, the at least two different beam selection vectors per layer to uniquely select a codeword $W_2$ from the frequency-selective codebook portion $C(W_2)$; and
   constructing a precoder W from the selected codeword $W_2$ and from another codeword $W_1$, the another codeword $W_1$ selected from the wideband codebook portion $C(W_1)$ for signalling channel conditions.

2. The method according to claim 1, further comprising utilizing an additional co-phasing term with the at least two different beam selection vectors per layer to uniquely select the codeword $W_2$ from the frequency-selective codebook portion $C(W_2)$, wherein
   the co-phasing term operates to ensure orthogonality of selected codeword pairs.

3. The method according to claim 1, wherein for each layer, the at least two different beam selection vectors correspond to different polarizations.

4. The method according to claim 1, wherein the frequency-selective codebook portion $C(W_2)$ comprises codewords for each of multiple RIs, and is characterised in that for each of the RIs each codeword of the frequency-selective codebook portion $C(W_2)$ is uniquely distinguished over all other codewords of the frequency-selective codebook portion $C(W_1)$ by at least two different beam selection vectors per layer.

5. The method according to claim 4, wherein
   when RI=2, the at least two different beam selection vectors for RI=2 comprise:
      $s_{i1}$ and $s_{i2}$ for a first one of the RI=2 layers, and
      $s_{k1}$ and $s_{k2}$ for a second one of the RI=2 layers, and
      $i_1, i_2, k_1$ and $k_2$ are selected from an integer set $\{1 \ldots M\}$ in which M represents a number of neighbouring base beams included in the another codeword $W_1$ that is selected from the wideband codebook portion $C(W_1)$, and $i_1 \neq i_2$ and $k_1 \neq k_2$.

6. The method according to claim 5, wherein for the second one of the layers, $i_1=k_2$ and $i_2=k_1$.

7. The method according to claim 5, wherein when RI=1, the at least two different beam selection vectors for RI=1 comprise $s_{i1}$ and $s_{i2}$ for the RI=1 layer.

8. The method according to claim 7, wherein when RI=3, the at least two different beam selection vectors for RI=3 comprise:
   $s_{i1}$ and $s_{i2}$ for a first one of the RI=3 layers,
   $s_{k1}$ and $s_{k2}$ for a second one of the RI=3 layers, and
   $s_{l1}$ and $s_{l2}$ for a third one of the RI=3 layers,
   wherein either
   $s_{i_1} \perp s_{l_1}$ and $s_{i_2} \perp s_{l_2}$ and $|l_1-k_1|=|l_2-k_2|$, or
   $s_{k_1} \perp s_{l_1}$ and $s_{k_2} \perp s_{l_2}$ and $|l_1-i_1|=|l_2-i_2|$.

9. The method according to claim 8, wherein each of the beam selection vectors in the third one of the RI=3 layers is orthogonal to each of the beam selection vectors in the first one and in the second one of the RI=3 layers that have corresponding polarizations.

10. An apparatus for controlling a wireless radio device to provide feedback about channel conditions, the apparatus comprising:

circuitry configured to:
  store, in a computer-readable memory of the wireless radio device, a double structured codebook comprising a wideband codebook portion $C(W_1)$ and a frequency-selective codebook portion $C(W_2)$, wherein the frequency-selective codebook portion $C(W_2)$ includes information structured so that for at least one rank index (RI), each codeword of the frequency-selective codebook portion $C(W_2)$ is uniquely distinguished over all other codewords of the frequency-selective codebook portion $C(W_2)$ by at least two beam selection vectors per layer, and the at least one RI is a positive integer;
  utilize, when the wireless radio device is configured with the at least one RI, the at least two different beam selection vectors per layer to uniquely select a codeword $W_2$ from the frequency-selective codebook portion $C(W_2)$; and
  construct a precoder $W$ from the selected codeword $W_2$ and from another codeword $W_1$, the another codeword $W_1$ selected from the wideband codebook portion $C(W_1)$ for signalling channel conditions.

11. The apparatus according to claim 10, wherein
  the circuitry is configured to utilize an additional co-phasing term with the at least two different beam selection vectors per layer to uniquely select the codeword $W_2$ from the frequency-selective codebook portion $C(W_2)$, and
  the co-phasing term operates to ensure orthogonality of selected codeword pairs.

12. The apparatus according to claim 10, wherein for each layer the at least two different beam selection vectors correspond to different polarizations.

13. The apparatus according to claim 10, wherein the frequency-selective codebook portion $C(W_2)$ comprises codewords for each of multiple RIs, and is characterised in that for each of the RIs each codeword of the frequency-selective codebook portion $C(W_2)$ is uniquely distinguished over all other codewords of the frequency-selective codebook portion $C(W_2)$ by at least two different beam selection vectors per layer.

14. The apparatus according to claim 13, wherein
  when R1=2, the at least two different beam selection vectors for RI=2 comprise:
    $s_{i1}$ and $s_{i2}$ for a first one of the RI=2 layers, and
    $S_{k1}$ and $S_{k2}$ for a second one of the RI=2 layers, and
    $i_1, i_2, k_1$ and $k_2$ are selected from an integer set $\{1 \ldots M\}$ in which M represents a number of neighbouring base beams included in the another codeword $W_1$ that is selected from the wideband codebook portion $C(W_1)$, and $i_1 \neq i_2$ and $k_1 \neq k_2$.

15. The apparatus according to claim 14, wherein for the second one of the layers, $i_1 = k_2$ and $i_2 = k_1$.

16. The apparatus according to claim 14, wherein when RI=1, the at least two different beam selection vectors for RI=1 comprise $s_{i1}$ and $s_{i2}$ for the RI=1 layer.

17. The apparatus according to claim 16, wherein when RI=3, the at least two different beam selection vectors for RI=3 comprise:
  $s_{i1}$ and $s_{i2}$ for a first one of the RI=3 layers,
  $s_{k1}$ and $s_{k2}$ for a second one of the RI=3 layers, and
  $s_{l1}$ and $s_{l2}$ for a third one of the RI=3 layers,
  wherein either
    $s_{i_1} \perp s_{l_1}$ and $s_{i_2} \perp s_{l_2}$ and $|l_1 - k_1| = |l_2 - k_2|$, or
    $s_{k_1} \perp s_{l_1}$ and $s_{k_2} \perp s_{l_2}$ and $|l_1 - i_1| = |l_2 - i_2|$.

18. The apparatus according to claim 17, wherein each of the beam selection vectors in the third one of the RI=3 layers is orthogonal to each of the beam selection vectors in the first one and in the second one of the layers that have corresponding polarizations.

19. A non-transitory computer readable medium storing computer-executable instructions that, when executed by circuitry of an apparatus, cause the apparatus to:
  store, in a computer-readable memory of a wireless radio device, a double structured codebook comprising a wideband codebook portion $C(W_1)$ and a frequency-selective codebook portion $C(W_2)$, wherein the frequency-selective codebook portion $C(W_2)$ includes information structured so that for at least one rank index RI, each codeword of the frequency-selective codebook portion $C(W_2)$ is uniquely distinguished over all other codewords of the frequency-selective codebook portion $C(W_2)$ by at least two beam selection vectors per layer, and the at least one RI is a positive integer;
  utilize, when the wireless radio device is configured with the at least one RI, the at least two different beam selection vectors per layer to uniquely select a codeword $W_2$ from the frequency-selective codebook portion $C(W_2)$; and
  construct a precoder $W$ from the selected codeword $W_2$ and from another codeword $W_1$, the another codeword $W_1$ selected from the wideband codebook portion $C(W_1)$ for signalling channel conditions.

20. The non-transitory computer readable medium according to claim 19, wherein
  the apparatus is further caused to utilize an additional co-phasing term with the at least two different beam selection vectors per layer to uniquely select the codeword $W_2$ from the frequency-selective codebook portion $C(W_2)$, and
  the co-phasing term operates to ensure orthogonality of selected codeword pairs.

* * * * *